United States Patent [19]

Schenkel

[11] Patent Number: 4,987,865
[45] Date of Patent: Jan. 29, 1991

[54] REDUCED FRICTION PISTON

[75] Inventor: Jerry Schenkel, Holland, Mich.

[73] Assignee: Wickes Manufacturing Company, Southfield, Mich.

[21] Appl. No.: 419,930

[22] Filed: Oct. 11, 1989

[51] Int. Cl.$^5$ .............................................. F02F 3/00
[52] U.S. Cl. ................................... 123/193 P; 92/223
[58] Field of Search ....................... 123/193 P; 92/223

[56] References Cited

U.S. PATENT DOCUMENTS

| | | | |
|---|---|---|---|
| 2,817,562 | 12/1957 | Fleming et al. | 309/4 |
| 4,075,934 | 2/1978 | Wacker et al. | 92/223 |
| 4,230,027 | 10/1980 | Promeyrat | 92/223 |
| 4,354,424 | 10/1982 | Nordlund | 92/69 |

FOREIGN PATENT DOCUMENTS

| | | | |
|---|---|---|---|
| 0563863 | 9/1958 | Canada | 92/223 |
| 1437544 | 11/1988 | U.S.S.R. | 123/193 P |

Primary Examiner—Andrew M. Dolinar
Assistant Examiner—M. Macy
Attorney, Agent, or Firm—David A. Greenlee

[57] ABSTRACT

A piston assembly (10) of the type for reciprocating in an internal combustion engine. The assembly (10) includes an integral aluminum head (12) and skirt (14). The skirt (14) has an outer surface for engaging a cylinder wall which includes a plurality of pointed ridges (24). The pointed ridges (24) extend annularly about the skirt (14) and are each separated by a valley (26). The ridges (24) and valleys (26) are coated with a fluorocarbon polymer. The piston therefore has an improved wear surface for increasing the efficiency of the engine.

6 Claims, 1 Drawing Sheet

REDUCED FRICTION PISTON

TECHNICAL FIELD

The present invention relates to a piston assembly for use in an internal combustion engine.

BACKGROUND ART

In an internal combustion engine, a plurality of pistons reciprocate inside of a plurality of respective cylinders. It is desirable to reduce the friction between the piston, and particularly the skirt of the piston, and the cylinder walls. Such a decrease in the friction results in greater efficiency of the engine.

Currently, piston skirts have finished surfaces which are defined by smooth curved raised portions and intermediate valley portions. This design resembles a sine wave configuration in that is has smooth alternating curved raised and smooth curved valley portions.

To further decrease friction between the skirt portion piston and the cylinder walls, it is known to coat the skirt portion with a fluorocarbon polymer. For example, U.S. Pat. No. 2,817,562 to Fleming et al, issued Dec. 24, 1957 shows a piston assembly having a skirt portion coated with a thin coating of polytetrafluoroethylene.

Also, the use of lightweight materials, such as aluminum to comprise the piston increases the efficiency of the engine. Such an aluminum piston is shown in U.S. Pat. No. 4,338,858 to Reitz, issued July 13, 1982.

SUMMARY OF THE INVENTION AND ADVANTAGES

According to the present invention there is provided a piston assembly of the type for reciprocating in a cylinder of an internal combustion engine. The assembly comprises a piston head. The assembly further comprises a piston skirt integral with the piston head and depending therefrom. The piston skirt includes an outer surface adapted for engaging the cylinder. The assembly is characterized by the outer surface of the piston skirt including a plurality of pointed ridges separated by valleys for engaging the cylinder. The ridges have an average height from between about 100 to about 180 microinches. The ridges have an average width of from between about 500 to about 800 microinches. Each ridge is spaced from the next adjacent of said ridges by from about 0.010 to about 0.014 inches.

Accordingly, there is provided a light-weight piston assembly having an improved surface finish on the skirt which reduces friction between the piston assembly and the cylinder wall thereby increasing the efficiency of the engine.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWING

Figure 1:
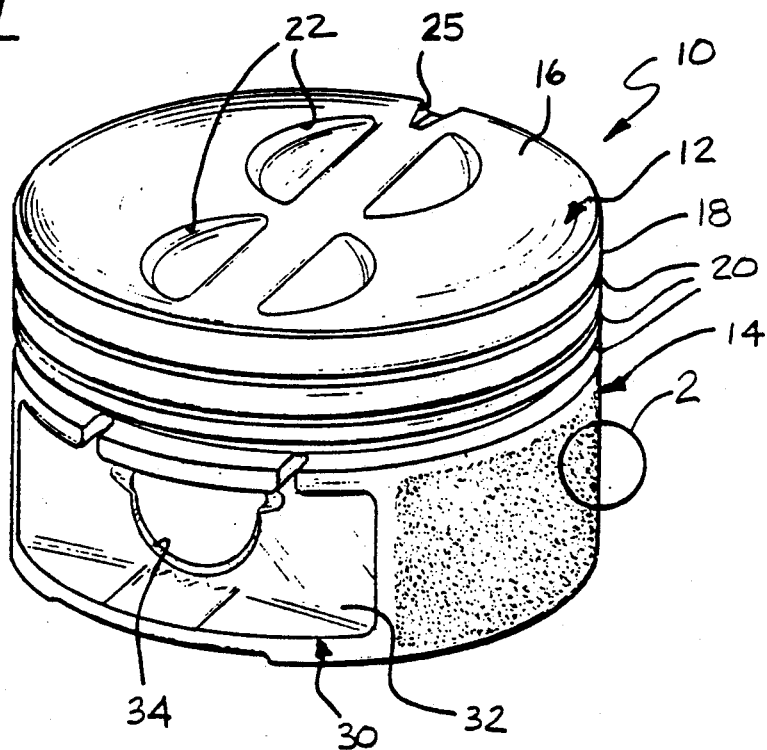
FIG. 1 is a perspective view of a piston assembly.

A piston assembly of the type for reciprocating in a cylinder of an internal combustion engine is generally shown at 10 in FIG. 1. The piston assembly 10 comprises a piston head generally indicated at 12 and a piston skirt 14 integral with the head 12 and depending therefrom. Both the head 12 and skirt 14 are made of a lightweight material, preferably aluminum.

The piston head 12 comprises an upper head end face 16 and a lower ring portion 18. The head end face 16 is circular and the lower ring portion 18 is cylindrical and depends from the upper head end face 16 and is annular about the periphery of the head end face 16. The lower ring portion 18 includes a plurality of grooves 20 therein. The grooves 20 extend annularly about the lower ring portion 18. One of the grooves 20, preferably the lowermost shown in FIG. 1, is to receive a compression ring as is well known in the art. The upper two grooves 20 are for receiving rings (not shown) which prevent oil from moving therepast and into the cylinder (not shown).

The head end face 16 has a plurality of depressions 22 therein each adapted to provide clearance for a valve from the engine. The valve (not shown) extends downwardly and into in the depression 22 during certain strokes or reciprocating movements of the piston assembly 10. These depressions prevent the valves from contacting the head end face 16 of the piston assembly 10. Further, the head end face 16 has a locating notch 25 therein for locating the assembly 10 and orienting it with respect to the engine.

Figure 2:
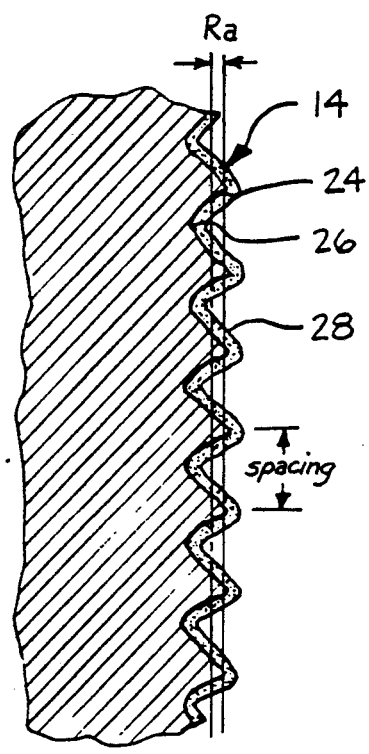
FIG. 2 is an exploded view of section 2 of FIG. 1.

The skirt 14 is generally cylindrical and integral with the lower ring portion of the piston head 12. The piston skirt 14 includes an outer surface adapted for engaging the cylinder (not shown). The outer surface of the skirt 14 includes a plurality of pointed ridges 24 (as best shown in FIG. 2). Each of the pointed ridges 24 is separated by a valley 26. The pointed ridges 24 extend annularly about the outer surface of the skirt 14 and are for engaging the cylinder (not shown).

The pointed ridges 24 and valleys 26 on the skirt 14 define a saw tooth-like finish. That is, each ridge 24 defines a discernible angle between the converging sides thereof at the pointed end. With this configuration, only the pointed ridges 24 engage the cylinder wall. Thus, friction between the piston skirt 14 and the cylinder wall is substantially reduced because the contact area of the piston skirt 14 with the cylinder is substantially smaller than was available in the prior art.

In addition to the skirt portion 14 including the pointed ridges 24 extending annularly thereabout, the lower ring portion 18 of the piston head 12 may also include the pointed ridges 24 separated by valleys 26 extending thereabout. This is because the lower ring portion 18 may also engage the cylinder wall during reciprocating movement of the assembly 10. By forming pointed ridges annularly about the lower ring portion 18, friction between the assembly 10 and the cylinder wall is reduced.

The head end face 16 may also have the pointed ridges thereon. On the head end face 16, the pointed ridges and valleys are concentric about the center point of the circular head end face 16. The finish is similar to that as described for the skirt 14.

The skirt 14 further includes a connecting portion generally indicated at 30. The connecting portion 30 includes an indented flat portion 32 and a hole 34 adapted for receiving a connecting rod to connect the piston assembly 10 with the rod. The connection of the piston assembly 10 with the connecting rod can be made in any manner well known in the art.

To further reduce friction between the skirt 14 and the cylinder, the skirt 14 is coated with a fluorocarbon polymer. That is, a coating 28 may be applied to the skirt such that the coating follows the contour of the pointed ridges 24 and valleys 26 such that the profile of the ridges 24 and valleys 26 remains after being coated (as best seen in FIG. 2). The coating can be applied using any conventional method.

Preferably, the fluorocarbon polymer used to coat the pointed ridges 24 and the valleys 26 is Emralon 334. Emralon 334 is available from the Acheson Colloids Company. The coating 28 initially engages the cylinder wall and is inherently lubrous thereby reducing friction between the skirt 14 and the cylinder wall.

Figure 3:
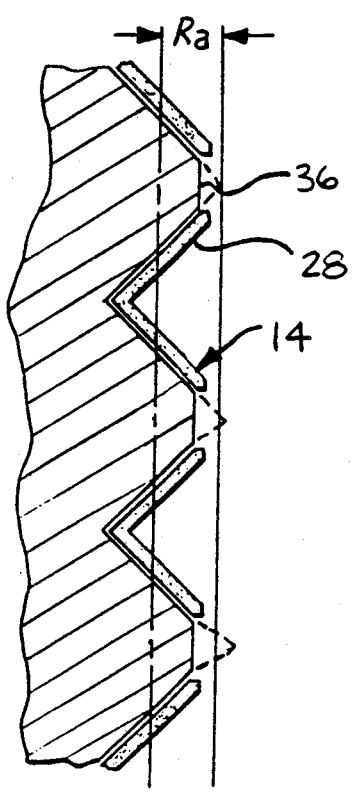
FIG. 3 is an exploded view showing a portion of the skirt surface after having worn.

FIG. 3 shows the skirt 14 after the skirt 14 has worn due to use. As can be seen, the points of the ridges 24 have worn away as has the coating 28 covering the points. What is left is an area of exposed (not coated) aluminum 36 and having the coating 28 on the edges thereof. Both the exposed aluminum area 36 and the coated edges 28 thereof engage the cylinder wall as the assembly 10 reciprocates. Typically, oil is introduced to the cylinder to further aid in friction resistance between the piston assembly 10 and the cylinder wall. The oil coats the skirt 14. Although not specifically known, it is hypothesized that when the skirt 14 has begun to wear (FIG. 3) the oil will bead on the coating 28 between the coating 28 and the cylinder wall. This is because the coating 28 is a non-wetting surface. That is, the coating 28 repels the oil. With the oil beaded on the coating 28 between the skirt 14 and cylinder wall, the oil provides a cushion upon which the piston assembly 10 reciprocates. In other words, the oil holds the skirt 14 surface away from the wall during reciprocating movement of the piston assembly 10. This is particularly beneficial after some of the coating 28 has worn away (FIG. 3). Because the coating still contacts the cylinder, oil can bead thereon and hold the exposed surface 36 away from the cylinder.

Figure 4:
FIG. 4 is an exploded view of a prior art skirt surface after having worn.

By utilizing the improved surface finish on the skirt 14 which includes a plurality of pointed ridges 24, a greater ratio of contact between the coating 28 and the aluminum skirt 14 is achieved after the piston assembly 10 has worn than was available in the prior art. That is, the prior art sine wave-like surface finish (FIG. 4), when the coating has worn, results in an area including a relatively large exposed aluminum segment having small coated edges engaging the cylinder wall. The present invention results in there being a relatively small exposed aluminum area 36 having larger amounts of contact of the coating 28 with the cylinder (FIG. 3). Thus, by utilizing the saw tooth or pointed ridge configuration, the ratio of contact of coating 28 to bare aluminum 36 is substantially increased over the prior art. As previously described, this results in a greater engine efficiency.

It has been found that there is an optimum skirt surface finish. If the finish is too fine, that is, the peaks or ridges 24 are too close together, the finish will scuff or be marred because there are no voids or gaps for foreign material to rest in. If the finish is too coarse, or the peaks are too far apart, the tips of each ridge 24 will tend to break off causing excessive clearance between the piston skirt 14 and the cylinder wall. The optimum specifications found are to use a surface finish having roughness characteristics of 100–189 Ra, 500–800 Rz, with a pitch, or spacing or 0.010–0.014 inches, where Ra, Rz and spacing are ISO measurements of roughness. This means that, the arithmetic average roughness height of each peak (Ra) should measure between 100 and 189 microinches, the ten-point average height difference between adjacent peaks and valleys (Rz) should measure from 500 to 800 microinches, and the pitch or spacing between adjacent peaks 24 should range from 0.010 to 0.014 inches. The spacing is further defined as the distance from a point on one peak to the same point on the next adjacent peak.

Several piston configurations were manufactured, placed in engines, and tested utilizing a standard test to determine the fuel consumption. The only variant in the test was the skirt surface finish on the pistons. Each test consisted of running the engine (all having the same skirt surface) at five different conditions and comparing the results with an engine having pistons with a different skirt surface.

This first set of tests was conducted using a Chevrolet V-8 5.7 liter engine. The engines were run at 500 RPM and 5 lb.-ft. torque to simulate an idle engine condition. The second condition was 750 RPM and 1 lb.-ft. torque to simulate a deceleration condition. The engines were also run at 1000 RPM and 30 lb.-ft. torque and at 1200 RPM at 40 lb.-ft. torque to simulate cruising conditions. Finally, the engines were run at 1100 RPM at 85 lb.-ft. torque to simulate acceleration.

The first test conducted compared a conventional prior art sine wave skirt configuration and a sine wave configuration coated with Emralon. The results showed that the coated skirt pistons resulted in a decrease in fuel consumption by 1.56%. Hence, by coating the same wave finish with Emralon the efficiency of the engine increased.

The second test compared a conventional sine wave finish against the improved saw tooth finish of the present invention, both skirt surfaces being uncoated, or bare aluminum. The improved saw tooth skirt configuration resulted in an overall 4.96% decrease in fuel consumption.

The third test compared a piston using the improved skirt saw tooth finish with a saw tooth finish coated with Emralon. One would expect the coating would increase the efficiency of the engine a comparable amount to that of the first test conducted (coating a sign-wave configuration). The increase in efficiency, however, was far greater than expected. By coating the improved saw tooth finish with Emralon, the fuel consumption was decreased by 3.70 percent.

The final test performed was a direct comparison between a standard uncoated sine-wave skirt with an improved coated saw tooth skirt. The net change expected here was a cumulative effect of changing from the sine-wave to the saw tooth configuration (test 2 above) and the change of adding Emralon to the uncoated saw tooth configuration (test 3 above). The test results proved this to be the case. The coated sine-wave skirt resulted in a decrease in fuel consumption by 8.34 percent over the standard uncoated sine-wave finish.

Other similar tests were conducted using a 3.8 liter V-6 engine and a 2.5 liter 4 cylinder engine. These tests used slightly different engine speeds to simulate the engine conditions of idle deceleration, cruise, and acceleration. The tests conducted in each instance compared the improved saw tooth finish with a coated saw-tooth finish to determine the effects of coating the saw tooth finish. In the V-6 engine, the fuel consumption decreased by 4.37% over the uncoated finish. Similarly, in the 4 cylinder engine, the coated saw tooth surface decreased fuel consumption by 5.13 percent over the uncoated saw tooth finish. As is evident, by reducing the number of cylinders, the effect of adding Emralon to the saw-tooth surface finish was enhanced. The specific reason for this result is not known. The results, however, in all cases show a significant decrease in fuel consumption.

The test results clearly indicate that by changing the surface finish from that of a conventional sine-wave pattern to a saw tooth pattern the efficiency of the engine is increased. Further, by coating the saw tooth configuration with Emralon, the engine efficiency, and hence milage is substantially increased.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A piston assembly of the type for reciprocating in a cylinder of an internal combustion engine, said assembly (10) comprising:

a piston head (12);

and a piston skirt (14) integral with said piston head (12) and depending therefrom; said piston skirt (14) including an outer surface adapted for engaging the cylinder;

said assembly (10) characterized by said outer surface of said piston skirt (14) having a surface roughness comprising a plurality of pointed ridges (24) separated by valleys (26) engaging the cylinder walls, with said ridges having an Ra measurement from between about 100 to about 180 microinches, said ridges having an Rz measurement of from between about 500 microinches to about 800 microinches, and said ridges having an average spacing of from about 0.010 inches to about 0.014 inches.

2. An assembly as set forth in claim 1 further characterized by including a fluorocarbon polymer on said ridges (24) and said valleys.

3. An assembly as set forth in claim 2 further characterized by a said coating (28) following the contour of said pointed ridges (24) and said valleys (26) such that the profile of the ridges (24) remains after being coated.

4. An assembly as set forth in claim 3 further characterized by said piston skirt (14) being generally cylindrical, said ridges (24) extending annularly about the outer surface of said piston skirt (14).

5. An assembly as set forth in claim 4 further characterized by said piston head (12) and said piston skirt (14) comprising aluminum.

6. An assembly as set forth in claim 5 further characterized by said fluorocarbon polymer comprising Emralon.

* * * * *